United States Patent
Park et al.

(10) Patent No.: US 11,448,074 B2
(45) Date of Patent: Sep. 20, 2022

(54) TURBINE AIRFOIL AND TURBINE INCLUDING SAME

(71) Applicants: DOOSAN ENERBILITY CO., LTD., Changwon-si (KR); INDUSTRY-ACADEMIC COOPERATION FOUNDATION, YONSEI UNIVERSITY, Seoul (KR)

(72) Inventors: Jung Shin Park, Seongnam (KR); Ki Hoon Yang, Yongin (KR); Ki Don Lee, Gimhae (KR); Hyung Hee Cho, Seoul (KR); Hee Seung Park, Seoul (KR); Seok Min Choi, Sejong (KR); Yong Jin Kim, Seoul (KR); Su Won Kim, Incheon (KR)

(*) Notice: Subject to any disclaimer, the term of this patent is extended or adjusted under 35 U.S.C. 154(b) by 0 days.

(21) Appl. No.: 17/562,104

(22) Filed: Dec. 27, 2021

(65) Prior Publication Data

US 2022/0220857 A1  Jul. 14, 2022

(30) Foreign Application Priority Data

Jan. 11, 2021  (KR) .......... 10-2021-0003610

(51) Int. Cl.
*F01D 5/18* (2006.01)
*F02C 7/18* (2006.01)

(52) U.S. Cl.
CPC ............ *F01D 5/186* (2013.01); *F02C 7/18* (2013.01); *F05D 2220/32* (2013.01); *F05D 2240/24* (2013.01); *F05D 2240/304* (2013.01); *F05D 2260/202* (2013.01); *F05D 2260/2212* (2013.01); *F05D 2260/22141* (2013.01)

(58) Field of Classification Search
CPC .... F01D 5/186; F01D 5/187; F05D 2240/304; F05D 2260/22141
See application file for complete search history.

(56) References Cited

U.S. PATENT DOCUMENTS 4,515,523 A * 5/1985 North ................ F01D 5/187
                                                     415/115
6,602,047 B1 * 8/2003 Barreto ................ F01D 9/04
                                                     415/115

(Continued)

FOREIGN PATENT DOCUMENTS

EP    0140257 B1    8/2014
EP    3628819 A1    4/2020
(Continued)

OTHER PUBLICATIONS

KR OA dated Jul. 5, 2022.

*Primary Examiner* — Eldon T Brockman
(74) *Attorney, Agent, or Firm* — Harvest IP Law, LLP (57) ABSTRACT

An airfoil having a leading edge and a trailing edge is provided. The airfoil includes a rear cooling path connected to the trailing edge to discharge air to the trailing edge, a plurality of cooling fins formed in the rear cooling path, and a flow guide rod connecting the cooling fins to support the cooling fins, wherein each of the plurality of cooling fins includes an upper fin portion protruding upward from an upper portion of the flow guide rod, a lower fin portion protruding downward from a lower portion of the flow guide rod, and an intermediate fin portion inserted through the flow guide rod.

20 Claims, 9 Drawing Sheets

(56) References Cited

U.S. PATENT DOCUMENTS

| | | | | |
|---|---|---|---|---|
| 8,562,295 | B1* | 10/2013 | Liang | F01D 5/189 |
| | | | | 29/889.7 |
| 10,443,396 | B2* | 10/2019 | Dyson | F01D 5/186 |
| 10,443,398 | B2* | 10/2019 | Krumanaker | F01D 5/187 |
| 11,230,930 | B2* | 1/2022 | Hoefler | F01D 5/187 |
| 2017/0107828 | A1* | 4/2017 | Krumanaker | F01D 5/147 |
| 2017/0356295 | A1* | 12/2017 | Dyson | F01D 5/186 |
| 2021/0102466 | A1* | 4/2021 | Hoefler | F01D 5/187 |

FOREIGN PATENT DOCUMENTS

| | | | |
|---|---|---|---|
| EP | 3875735 A1 * | 9/2021 | |
| JP | 2015105656 A | 6/2015 | |
| KR | 1020050079212 A | 8/2005 | |
| KR | 101513474 B1 | 4/2015 | |
| WO | 2018186891 A1 | 10/2018 | |

* cited by examiner

TURBINE AIRFOIL AND TURBINE INCLUDING SAME

CROSS REFERENCE TO RELATED APPLICATION

This application claims priority to Korean Patent Application No. 10-2021-0003610, filed on Jan. 11, 2021, the disclosure of which is incorporated herein by reference in its entirety.

BACKGROUND

1. Field

Apparatuses and methods consistent with exemplary embodiments relate to a turbine airfoil and a turbine including the same.

2. Description of the Related Art

A gas turbine is a combustion engine in which a mixture of air compressed by a compressor and fuel is combusted to produce a high temperature gas that drives a turbine. The gas turbine is used to drive electric generators, aircraft, ships, trains, or the like.

The gas turbine includes a compressor, a combustor, and a turbine. The compressor serves to intake external air, compress the air, and transfer the compressed air to the combustor. The compressed air compressed by the compressor has a high temperature and a high pressure. The combustor serves to mix compressed air supplied from the compressor and fuel and combust the mixture of compressed air and fuel to produce combustion gas. The combustion generated by the combustion is discharged to the turbine. Turbine blades in the turbine are rotated by the combustion gas to produce power. The generated power may be used in various fields such as generation of electricity, driving of mechanical units, etc.

Recently, in order to increase the efficiency of a turbine, the temperature of the gas flowing into the turbine (Turbine Inlet Temperature: TIT) is continuously increasing, and thus, the importance of heat-resistant treatment and cooling of turbine blades is being emphasized.

A method of cooling the turbine blades includes a film cooling method and an internal cooling method. The film cooling method is a method in which a coating film is formed on an outer surface of the turbine blade to prevent heat transfer from the outside to the turbine blade. According to the film cooling method, the heat-resistant paint applied to the turbine blade determines heat-resistant properties and mechanical durability of the turbine blade.

The internal cooling method is a method of cooling the blades through heat exchange between a cooling fluid and the blades. The turbine blades are cooled by compressed cooling air supplied from the compressor of the gas turbine. Because the compressed air compressed by the compressor is generated to be used in the combustor of the gas turbine, the entire efficiency of the gas turbine may be reduced if the amount of compressed air is increased to cool the turbine blades. Therefore, to efficiently cooling the turbine blade, the entirety of the blade is required to be uniformly cooled by a small amount of cooling fluid.

SUMMARY

Aspects of one or more exemplary embodiments provide an airfoil having improved cooling efficiency and a turbine including the same.

Additional aspects will be set forth in part in the description which follows and, in part, will become apparent from the description, or may be learned by practice of the exemplary embodiments.

According to an aspect of an exemplary embodiment, there is provided an airfoil having a leading edge and a trailing edge, the airfoil including: a rear cooling path connected to the trailing edge to discharge air to the trailing edge, a plurality of cooling fins formed in the rear cooling path, and a flow guide rod connecting the cooling fins to support the cooling fins, wherein each of the plurality of cooling fins includes an upper fin portion protruding upward from an upper portion of the flow guide rod, a lower fin portion protruding downward from a lower portion of the flow guide rod, and an intermediate fin portion inserted through the flow guide rod.

The flow guide rod may be formed to extend in a height direction of the airfoil.

The airfoil may include a first inclined surface pressing cooling air against one side of the rear cooling path, and a second inclined surface pressing the cooling air against the other side of the rear cooling path.

The flow guide rod may have a thickness gradually decreasing toward the trailing edge.

The flow guide rod may include a wedge portion having a thickness gradually decreasing toward the trailing edge, a front convex portion connected to a leading end of the wedge portion to protrude in an arc shape, and a rear convex portion connected to a rear end of the wedge portion to protrude in an arc shape.

A surface of the flow guide rod may be provided with a plurality of turbulence forming protrusions forming turbulence.

The turbulence forming protrusions may be formed in the wedge portion and the rear convex portion.

A surface of the flow guide rod may be provided with a plurality of turbulence forming grooves forming turbulence.

The flow guide rod may include a corner portion formed at a leading end thereof, a rear planar portion formed at a rear end thereof, and two inclined surfaces connecting the corner portion and the rear planar portion, the inclined surfaces having a thickness gradually decreasing toward the trailing edge.

The flow guide rod may include a front convex portion disposed at a leading end thereof to protrude in an arc shape, a rear concave portion disposed at a rear end thereof to be recessed in an arc shape, a wedge portion connecting the front convex portion and the rear concave portion and having a thickness gradually decreasing toward the trailing edge.

According to an aspect of another exemplary embodiment, there is provided a turbine including: a rotor disk configured to be rotatable; and a plurality of turbine blades installed on the rotor disk, wherein each of the turbine blades includes an airfoil having an airfoil shape and including a leading edge and a trailing edge, a platform part coupled to a lower portion of the airfoil, and a root part protruding downward from the platform part and coupled to the rotor disk, wherein the airfoil includes a rear cooling path connected to the trailing edge to discharge air to the trailing edge, a plurality of cooling fins formed in the rear cooling path, and a flow guide rod connecting the cooling fins to support the cooling fins, wherein each of the plurality of cooling fins includes an upper fin portion protruding upward from an upper portion of the flow guide rod, a lower fin portion protruding downward from a lower portion of the flow guide rod, and an intermediate fin portion inserted through the flow guide rod.

The flow guide rod may be formed to extend in a height direction of the airfoil.

The airfoil may include a first inclined surface pressing cooling air against one side of the rear cooling path, and a second inclined surface pressing the cooling air against the other side of the rear cooling path.

The flow guide rod may have a thickness gradually decreasing toward the trailing edge.

The flow guide rod may include a wedge portion having a thickness gradually decreasing toward the trailing edge, a front convex portion connected to a leading end of the wedge portion to protrude in an arc shape, and a rear convex portion connected to a rear end of the wedge portion to protrude in an arc shape.

A surface of the flow guide rod may be provided with a plurality of turbulence forming protrusions forming turbulence.

The turbulence forming protrusions may be formed in the wedge portion and the rear convex portion.

A surface of the flow guide rod may be provided with a plurality of turbulence forming grooves forming turbulence.

The flow guide rod may include a corner portion formed at a leading end thereof, a rear planar portion formed at a rear end thereof, and two inclined surfaces connecting the corner portion and the rear planar portion, the inclined surfaces having a thickness gradually decreasing toward the trailing edge.

According to an aspect of another exemplary embodiment, there is provided a gas turbine including: a compressor configured to compress air introduced from an outside; a combustor configured to mix the compressed air compressed by the compressor with fuel and combust an air-fuel mixture; and a turbine including a plurality of turbine blades rotating by combustion gas discharged from the combustor, wherein each of the turbine blades includes an airfoil having an airfoil shape and including a leading edge and a trailing edge, a platform part coupled to a lower portion of the airfoil, and a root part protruding downward from the platform part and coupled to the rotor disk, wherein the airfoil includes a rear cooling path connected to the trailing edge to discharge air to the trailing edge, a plurality of cooling fins formed in the rear cooling path, and a flow guide rod connecting the cooling fins to support the cooling fins, wherein each of the plurality of cooling includes an upper fin portion protruding upward from an upper portion of the flow guide rod, a lower fin portion protruding downward from a lower portion of the flow guide rod, and an intermediate fin portion inserted through the flow guide rod.

According to the airfoil and turbine according to one or more exemplary embodiments, because the flow guide rod is coupled to the cooling fins, and the cooling fins include portions protruding above or below the flow guide rod, the flow guide rod guides cooling air toward an inner wall of the airfoil, so that the cooling efficiency can be improved, and the flow rate can be increased to increase turbulence due to reduced flow path area, thereby further improving the cooling efficiency.

BRIEF DESCRIPTION OF THE DRAWINGS

The above and other aspects will become more apparent from the following description of the exemplary embodiments with reference to the accompanying drawings, in which.

DETAILED DESCRIPTION

Various modifications and various embodiments will be described in detail with reference to the accompanying drawings so that those skilled in the art can easily carry out the disclosure. It should be understood, however, that the various embodiments are not for limiting the scope of the disclosure to the specific embodiment, but they should be interpreted to include all modifications, equivalents, and alternatives of the embodiments included within the spirit and scope disclosed herein.

Terms used herein are for the purpose of describing specific embodiments only and are not intended to limit the scope of the disclosure. As used herein, an element expressed as a singular form includes a plurality of elements, unless the context clearly indicates otherwise. Further, terms such as "comprising" or "including" should be construed as designating that there are such features, numbers, steps, operations, elements, parts, or combinations thereof, not to exclude the presence or addition of one or more other features, numbers, steps, operations, elements, parts, or combinations thereof.

Hereinafter, exemplary embodiments will be described in detail with reference to the accompanying drawings. It is noted that like reference numerals refer to like parts throughout the different drawings and exemplary embodiments. In certain embodiments, a detailed description of known functions and configurations well known in the art will be omitted to avoid obscuring appreciation of the disclosure by a person of ordinary skill in the art. For the same reason, some elements are exaggerated, omitted, or schematically illustrated in the accompanying drawings.

Hereinafter, a gas turbine according to a first exemplary embodiment will be described with reference to the accompanying drawings.

Figure 1:
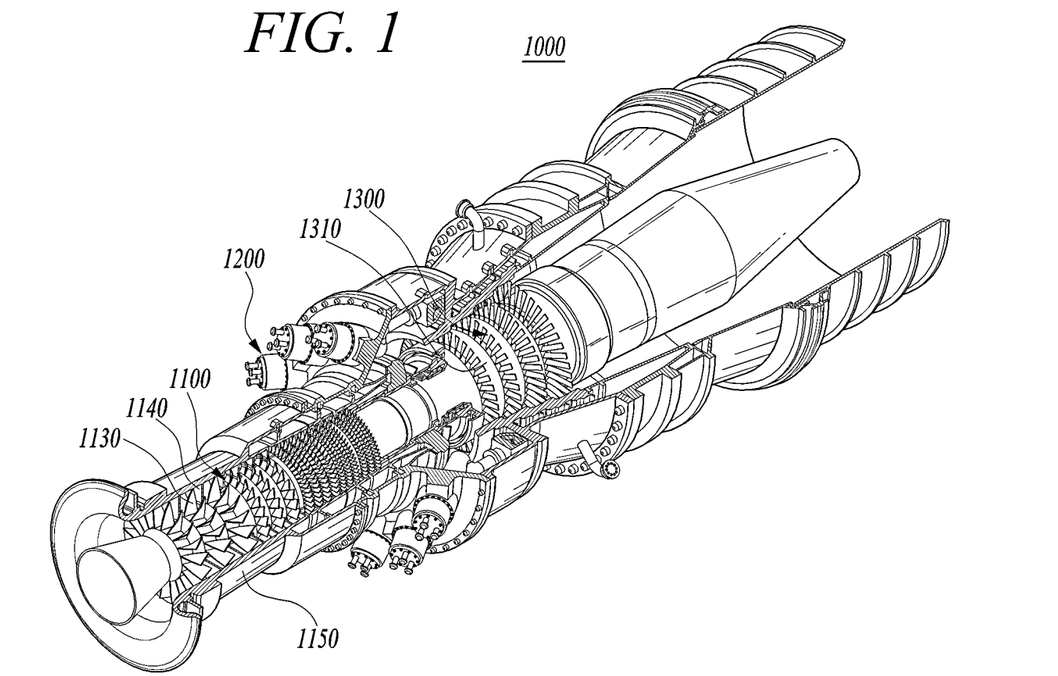
FIG. 1 is a view illustrating an interior of a gas turbine according to a first exemplary embodiment.
Figure 2:
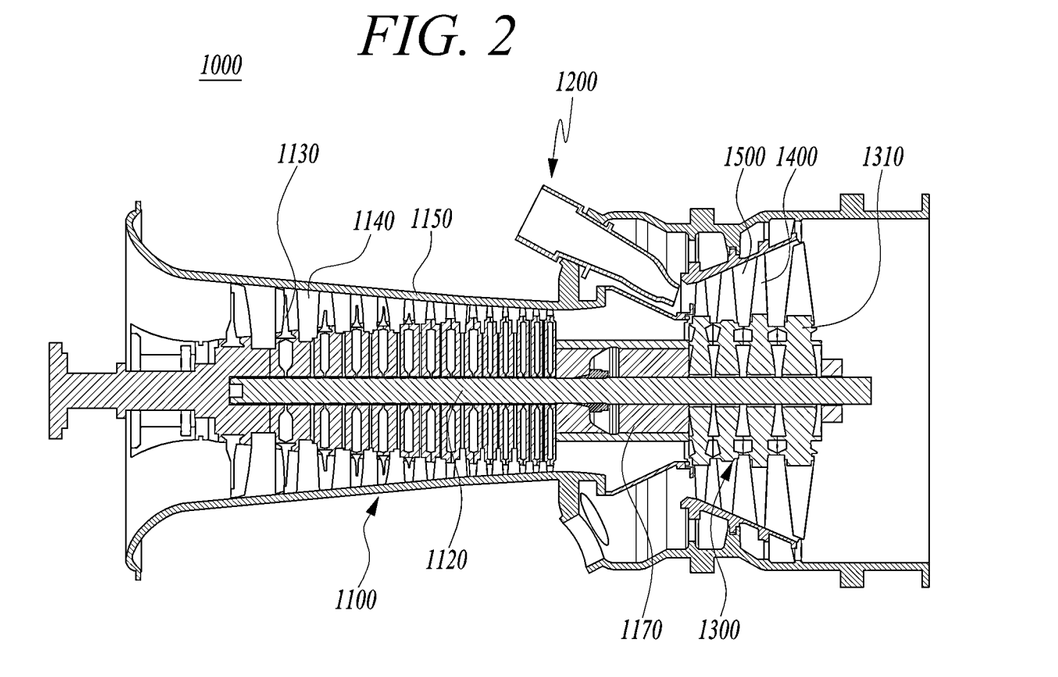
FIG. 2 is a longitudinal-sectional view illustrating a part of the gas turbine of FIG. 1.

FIG. 1 is a view illustrating an interior of a gas turbine according to an exemplary embodiment, and FIG. 2 is a longitudinal-sectional view of the gas turbine of FIG. 1.

An ideal thermodynamic cycle of a gas turbine 1000 may comply with a Brayton cycle. The Brayton cycle consists of four thermodynamic processes: an isentropic compression (i.e., an adiabatic compression), an isobaric combustion, an isentropic expansion (i.e., an adiabatic expansion) and isobaric heat ejection. That is, in the Brayton cycle, thermal energy may be released by combustion of fuel in an isobaric environment after atmospheric air is sucked and compressed into high pressure air, hot combustion gas may be expanded to be converted into kinetic energy, and exhaust gas with residual energy may be discharged to the outside. As such, the Brayton cycle consists of four thermodynamic processes including compression, heating, expansion, and heat ejection.

The gas turbine 1000 employing the Brayton cycle includes a compressor 1100, a combustor 1200, and a turbine 1300. Although the following description will be described with reference to FIG. 1, the present disclosure may be widely applied to other turbine engines similar to the gas turbine 1000 illustrated in FIG. 1.

Referring to FIGS. 1 and 2, the compressor 1100 of the gas turbine 1000 may suck and compress air. The compressor 1100 may supply the compressed air by compressor blades 1130 to a combustor 1200 and also supply the cooling air to a high temperature region of the gas turbine 1000. Here, because the sucked air is compressed in the compressor 1100 through an adiabatic compression process, the pressure and temperature of the air passing through the compressor 1100 increases.

The compressor 1100 may be designed in a form of a centrifugal compressor or an axial compressor, and the centrifugal compressor is applied to a small-scale gas turbine, whereas a multi-stage axial compressor 1100 is applied to a large-scale gas turbine 1000 illustrated in FIG. 1 to compress a large amount of air. In the multi-stage axial compressor 1100, the compressor blades 1130 rotate according to a rotation of a central tie rod 1120 and rotor disks, compress the introduced air and move the compressed air to compressor vanes 1140 disposed at a following stage. The air is compressed gradually to a high pressure while passing through the blades 1130 formed in multiple stages.

The compressor vanes 1140 are mounted inside a housing 1150 in such a way that a plurality of compressor vanes 1140 form each stage. The compressor vanes 1140 guide the compressed air moved from compressor blades 1130 disposed at a preceding stage toward compressor blades 1130 disposed at a following stage. For example, at least some of the compressor vanes 1140 may be mounted so as to be rotatable within a predetermined range, e.g., to adjust an air inflow.

The compressor 1100 may be driven using a portion of the power output from the turbine 1300. To this end, a rotary shaft of the compressor 1100 and a rotary shaft of the turbine 1300 may be directly connected by a torque tube 1170. In the case of the large-scale gas turbine 1000, almost half of the output produced by the turbine 1300 may be consumed to drive the compressor 1100.

The combustor 1200 may mix compressed air supplied from an outlet of the compressor 1100 with fuel and combust the air-fuel mixture at a constant pressure to produce a high-energy combustion gas. That is, the combustor 1200 mixes the inflowing compressed air with fuel and combusts the mixture to produce high-temperature and high-pressure combustion gas with high energy, and increases, through an isobaric combustion process, the temperature of the combustion gas to a heat resistant limit temperature at which parts of the combustor and parts of the turbine can withstand without being thermally damaged.

A plurality of combustors constituting the combustor 1200 may be arranged in a housing in a form of a cell. Each combustor 1200 may include a plurality of burners including a fuel injection nozzle, a combustor liner forming a combustion chamber, and a transition piece serving as a connector between the combustor and the turbine.

The high-temperature and high-pressure combustion gas discharged from the combustor 1200 is supplied to the turbine 1300. The supplied high-temperature and high-pressure combustion gas expands and applies impulse or impact force to the turbine blades 1400 to generate rotational torque. A portion of the rotational torque is transferred to the compressor 1100 through a torque tube 1170, and the remaining portion which is the excessive torque is used to drive a generator, or the like.

The turbine 1300 includes a rotor disk 1310, a plurality of turbine blades 1400 and turbine vanes 1500 arranged radially on the rotor disk 1310.

The rotor disk 1310 has a substantially disk shape, and a plurality of grooves are formed in an outer circumferential surface thereof. The grooves are formed to have a curved surface, and the turbine blades 1400 and the turbine vanes 1500 are inserted into the grooves. The turbine blades 1400 may be coupled to the rotor disk 1310 in a dovetail coupling manner. The turbine vanes 1500 fixed to the housing are provided between the turbine blades 1400 to guide a flow direction of the combustion gas passing through the turbine blades 1400.

Figure 3:
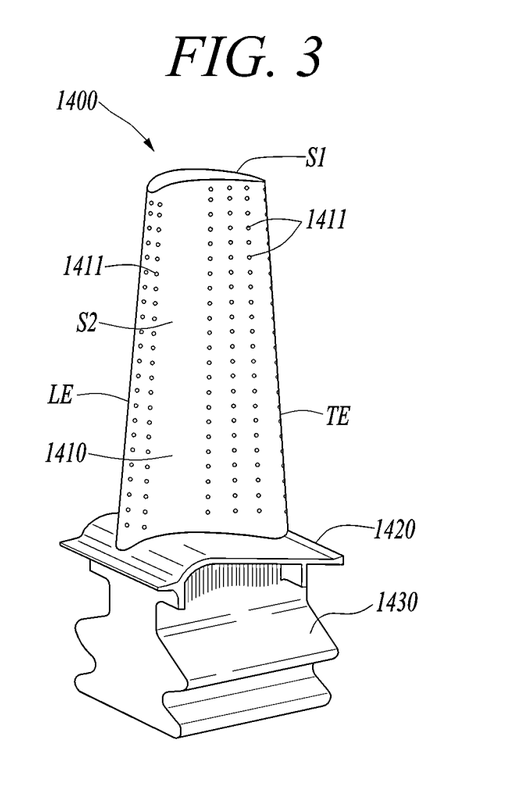
FIG. 3 is a perspective view illustrating a turbine blade according to the first exemplary embodiment.
Figure 4:
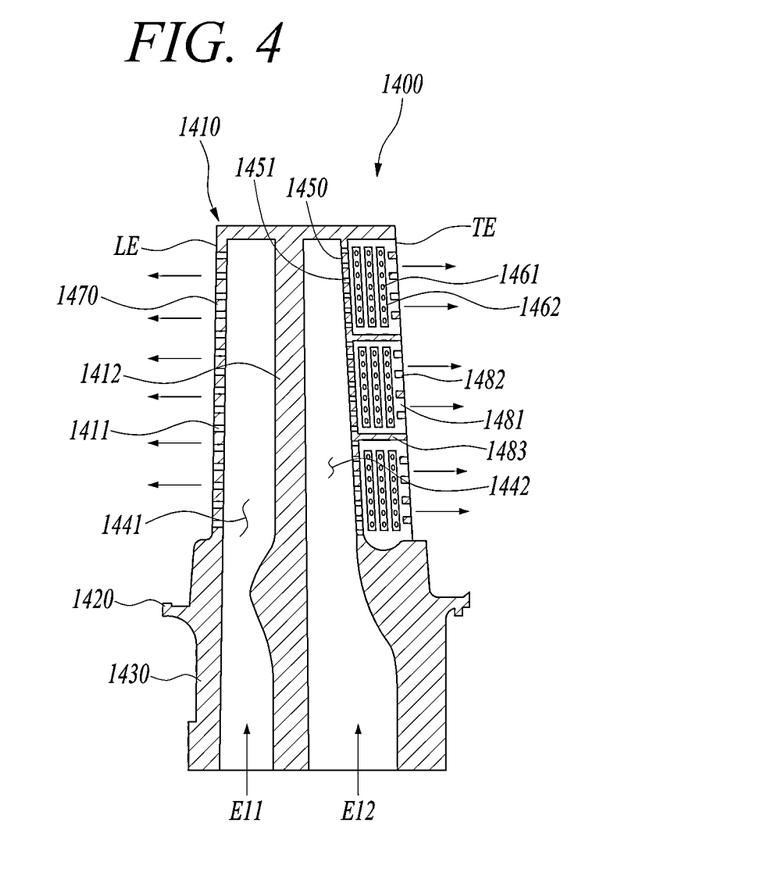
FIG. 4 is a longitudinal-sectional view illustrating the turbine blade according to the first exemplary embodiment.
Figure 5:
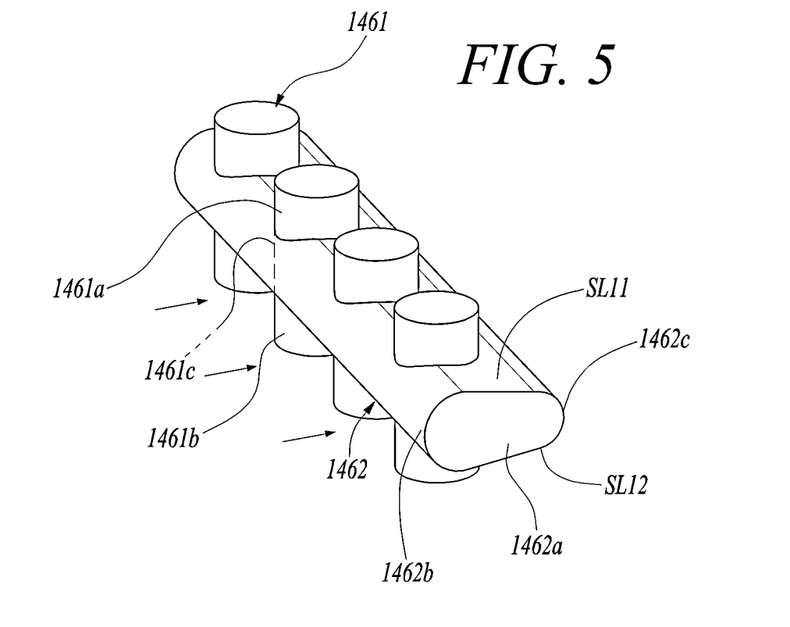
FIG. 5 is a perspective view illustrating cooling fins and a flow guide rod according to the first exemplary embodiment.
Figure 6:
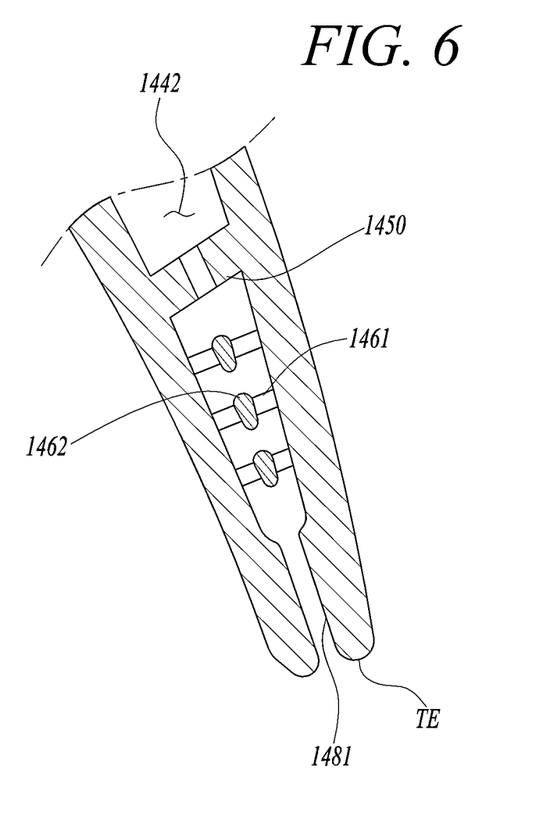
FIG. 6 is a partial sectional view illustrating an airfoil according to the first exemplary embodiment.

FIG. 3 is a perspective view illustrating a turbine blade according to the first exemplary embodiment. FIG. 4 is a longitudinal-sectional view illustrating the turbine blade according to the first exemplary embodiment. FIG. 5 is a perspective view illustrating cooling fins and a flow guide rod according to the first embodiment. FIG. 6 is a partial sectional view illustrating an airfoil according to the first embodiment.

Referring to FIGS. 3 and 4, the turbine blade 1400 includes an airfoil-shaped airfoil part 1410, a platform part 1420 coupled to a lower portion of the airfoil part 1410, and a root part 1430 that protrudes downward from the platform part 1420 and is coupled to the rotor disk. The airfoil part 1410 may be a curved plate having a blade shape, and have an optimized blade shape depending on specifications of the gas turbine 1000.

The platform part 1420 may be disposed between the airfoil part 1410 and the root part 1430 and have a substantially rectangular plate or rectangular pillar shape. The platform part 1420 has a side surface which is in contact with a side surface of a platform part of an adjacent turbine blade 1400 to maintain a gap between the adjacent turbine blades 1400.

The root part 1430 has a curved portion having an approximately fir-tree shape corresponding to the fir-tree shaped curved portion formed in a slot of the rotor disk 1310. It is understood that a coupling structure of the root part 1430 is not limited thereto, and may be formed to have a dovetail shape. A first inlet E11 and a second inlet E12 for supplying cooling air may be formed in a lower end of the root part 1430.

The airfoil part 1410 may include a leading edge LE disposed on an upstream side and a trailing edge TE disposed on a downstream side based on a flow direction of combustion gas. In addition, a suction surface S1 protruding outward to have an outward-convex curved surface is formed on a front side of the airfoil part 1410 onto which combustion gas is introduced, and a pressure surface S2 having a curved surface depressed in a concave shape toward the suction side S1 is formed on a rear side of the airfoil part 1410. A difference in pressure occurs between the suction surface S1 and the pressure surface S2 of the airfoil part 1410, and the turbine 1300 rotates.

A plurality of cooling holes 1411 are formed in a surface of the airfoil part 1410 such that the cooling holes 1411 communicate with a cooling path formed in the airfoil part 1410 to supply cooling air to the surface of the airfoil part 1410.

The airfoil part 1410 may include an outer wall 1470 forming an outer contour, cooling paths 1441 and 1442 formed in the outer wall 1470, a dividing plate 1412, a partition wall 1483, and a perforated plate 1450.

The airfoil part 1410 may include a front cooling path 1441 connected to the leading edge LE and a rear cooling path 1442 connected to the trailing edge TE. The dividing plate 1412 of the airfoil part 1410 extends in a height direction of the airfoil part 1410 to divide an inner space of the airfoil part 1410 into the front cooling path 1441 and the rear cooling path 1442. However, the present disclosure is not limited thereto, and the airfoil part 1410 may include two or more dividing plates 1412, so three or more cooling paths may be formed in the airfoil part 1410.

The front cooling path 1441 communicates with the first inlet E11 formed in the lower portion of the turbine blade 1400, and the rear cooling path 1442 communicates with the second inlet E12 formed in the lower portion of the turbine blade 1400.

The perforated plate 1450 may be installed between the rear cooling path 1442 and the trailing edge TE. The perforated plate 1450 extends in a height direction of the rear cooling path 1442. The perforated plate 1450 may include a plurality of holes 1451, and a space between the perforated plate 1450 and the trailing edge TE is divided by the partition wall 1483 spaced apart in the height direction of the airfoil part 1410. One end of the partition wall 1483 may be connected to the perforated plate 1450, and the other end of the partition wall 1483 may be connected to the trailing edge TE.

The airfoil part 1410 may further include a plurality of rear end cooling slots 1481 which are spaced apart in the height direction of the trailing edge TE and are connected to the rear cooling path 1442 to discharge air in the rear cooling path 1442, and a plurality of dividing protrusions 1482 formed between the rear end cooling slots 1481 to separate the rear end cooling slots 1481. The air introduced into the rear cooling path 1442 through the perforated plate 1450 is discharged to the outside through the rear end cooling slots 1481.

The air supplied through the first inlet E11 is discharged through the cooling holes 1411 after cooling the airfoil part 1410, a portion of the air supplied through the second inlet E12 is discharged through the cooling holes 1411, and the remaining air is discharged through the rear end cooling slots 1481.

Referring to FIGS. 4 to 6, the airfoil part 1410 may further include cooling fins 1461 and a flow guide rod 1462 installed between the perforated plate 1450 and the trailing edge TE.

The cooling fins 1461 may have a cylindrical shape and may be arranged at intervals in the rear cooling path 1442. The flow guide rod 1462 extends in the height direction of the airfoil part 1410 to connect the cooling fins 1461. The flow guide rod 1462 supports the cooling fins 1461 and guides a flow of cooling air to improve cooling efficiency.

Each of the cooling fins 1461 includes an upper fin portion 1461a protruding upward from an upper portion of the flow guide rod 1462, a lower fin portion 1461b protruding downward from a lower portion of the flow guide rod 1462, and an intermediate fin portion 1461c inserted into the flow guide rod 1462. The upper fin portion 1461a and the lower fin portion 1461b receive heat from a wall surface of the airfoil part 1410, and the intermediate fin portion 1461c transfers the heat to the flow guide rod 1462. Here, the upper fin portion 1461a, the lower fin portion 1461b, and the flow guide rod 1462 may be cooled by cooling air.

The flow guide rod 1462 may be formed to gradually decrease in thickness toward the trailing edge TE. The flow guide rod 1462 may include a wedge portion 1462a gradually decreasing in thickness toward the trailing edge TE, a front convex portion 1462b protruding and connected to a leading edge of the wedge portion 1462a in an arc shape, and a rear convex portion 1462c protruding and connected to a rear end of the wedge portion 1462a in an arc shape. Here, a radius of curvature of the rear convex portion 1462c is formed to be smaller than that of the front convex portion 1462b.

In addition, the flow guide rod 1462 may include a first inclined surface SL11 for pressing the cooling air to one side of the rear cooling path 1442 and a second inclined surface SL12 for pressing the cooling air to the other surface of the rear cooling path 1442. Here, both sides of the rear cooling path 1442 are opposite surfaces facing each other at a predetermined distance.

Accordingly, while flowing toward the trailing edge TE, the cooling air flowing along the flow guide rod 1462 is pressed against one inner surface of the airfoil part 1410 by the first inclined surface SL11 and pressed against the other inner surface of the airfoil part 1410 by the second inclined surface SL12, thereby improving the cooling efficiency.

In addition, the flow guide rod 1462 reduces a flow path area and increases the flow rate, and as the thickness decreases toward the rear side, laminar flow separation occurs at the rear convex portion 1462c and turbulence increases, thereby improving the cooling efficiency.

Figure 7:
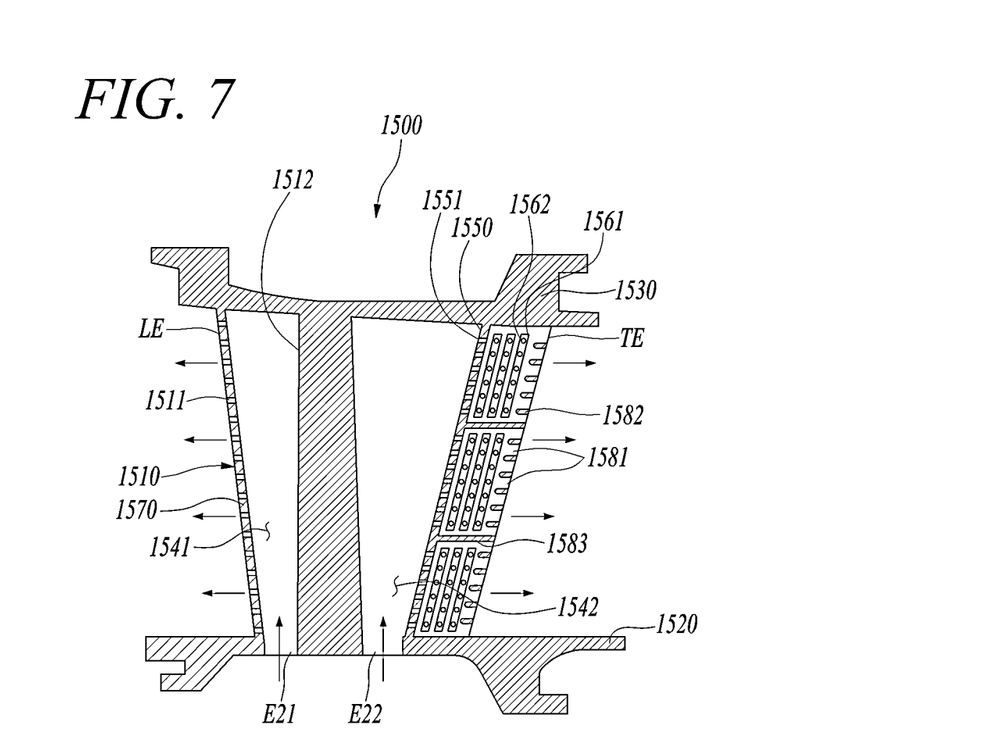
FIG. 7 is a longitudinal-sectional view illustrating a turbine vane according to the first exemplary embodiment.

FIG. 7 is a longitudinal-sectional view illustrating a turbine vane according to the first exemplary embodiment.

Referring to FIG. 7, the turbine vane 1500 includes an inner shroud 1520, an outer shroud 1530, and an airfoil part 1510 disposed between the inner shroud 1520 and the outer shroud 1530. The inner shroud 1520 may include a first inlet E21 and a second inlet E22 through which air is introduced. However, the present disclosure is not limited thereto, and the first inlet E21 and the second inlet E22 may be formed in the outer shroud 1530.

The airfoil part 1510 may include a leading edge LE disposed on an upstream side and a trailing edge TE disposed on a downstream side based on a flow direction of combustion gas. A plurality of cooling holes 1511 are formed in a surface of the airfoil part 1510 such that the cooling holes 1511 communicate with a cooling path formed in the airfoil part 1510 to supply cooling air to the surface of the airfoil part 1510.

The airfoil part 1510 may include an outer wall 1570 forming an outer contour, cooling paths 1541 and 1542 formed in the outer wall 1570, a dividing plate 1512, a partition wall 1583, and a perforated plate 1550.

The airfoil part 1510 may include a front cooling path 1541 connected to the leading edge LE and a rear cooling path 1542 connected to the trailing edge TE. The dividing plate 1512 of the airfoil part 1510 extends in a height direction of the airfoil part 1510 to divide an inner space of the airfoil part 1510 into the front cooling path 1541 and the rear cooling path 1542.

However, the present disclosure is not limited thereto, and the airfoil part 1510 may include two or more dividing plates 1512, so three or more cooling paths may be formed in the airfoil part 1510.

The front cooling path 1541 communicates with the first inlet E21 formed in the lower portion of the turbine vane 1500, and the rear cooling path 1542 communicates with the second inlet E22 formed in the lower portion of the turbine vane 1500.

The perforated plate 1550 may be installed between the rear cooling path 1542 and the trailing edge TE. The perforated plate 1550 extends in a height direction of the rear cooling path 1542. The perforated plate 1550 may include a plurality of holes 1551, and a space between the perforated plate 1550 and the trailing edge TE is divided by the partition wall 1583 spaced apart in the height direction of the airfoil part 1510. One end of the partition wall 1583 may be connected to the perforated plate 1550, and the other end of the partition wall 1583 may be connected to the trailing edge TE.

The airfoil part 1510 may further include a plurality of rear end cooling slots 1581 which are spaced apart in the height direction of the trailing edge TE and are connected to the rear cooling path 1542 to discharge air in the rear cooling path 1542, and a plurality of dividing protrusions 1582 formed between the rear end cooling slots 1581 to separate the rear end cooling slots 1581. The air introduced into the rear cooling path 1542 through the perforated plate 1550 is discharged to the outside through the rear end cooling slots 1581.

The air supplied through the first inlet E21 is discharged through the cooling holes 1511 after cooling the airfoil part, a portion of the air supplied through the second inlet E22 is discharged through the cooling holes 1511, and the remaining air is discharged through the rear end cooling slots 1581.

The airfoil part 1510 may further include cooling fins 1561 and a flow guide rod 1562 installed between the perforated plate 1550 and the trailing edge TE. Because the cooling fins 1561 and the flow guide rod 1562 have the same structure as the cooling fins 1461 and the flow guide rod 1462 installed on the turbine blade 1400, a redundant description will be omitted.

Figure 8:
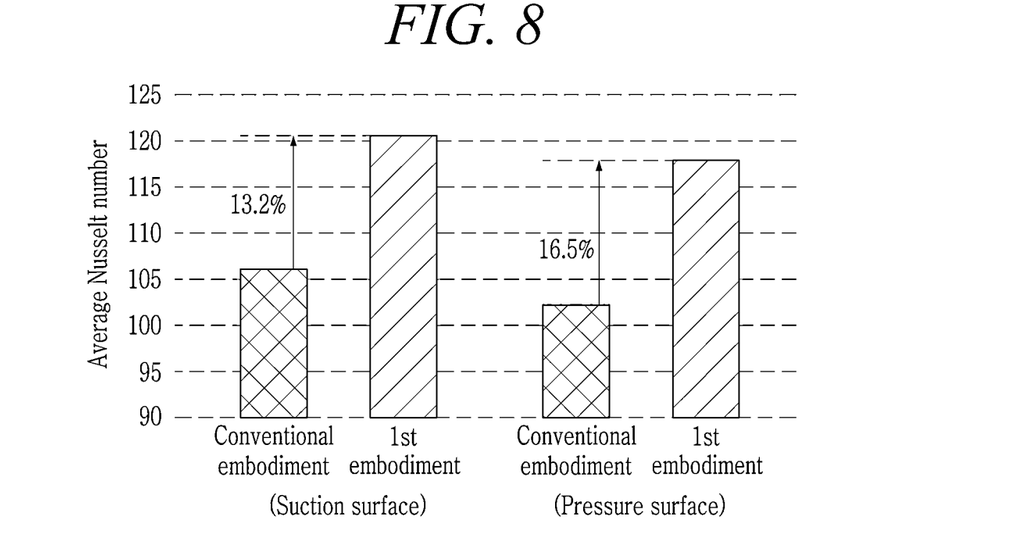
FIG. 8 is a graph comparatively illustrating the Nusselt number of the cooling fins according to the first exemplary embodiment and the Nusselt number of a related art cooling fins.

FIG. 8 is a graph comparatively illustrating the Nusselt number of the cooling fins according to the first exemplary embodiment and the Nusselt number of a related art cooling fins. Here, although the related art cooling fins are not connected to the flow guide rod, the cooling fins are cylindrical cooling fins installed under the same conditions as those of the first exemplary embodiment. FIG. 8 shows the measured Nusselt number of cooling fins installed on the turbine blade 1400.

Referring to FIG. 8, when the flow guide rod 1462 is installed according to the first exemplary embodiment, it can be seen that the Nusselt number on the suction surface S1 and the pressure surface S2 is increased by 10% or more compared to the case in which only the cooling fins 1461 are installed.

Figure 9:
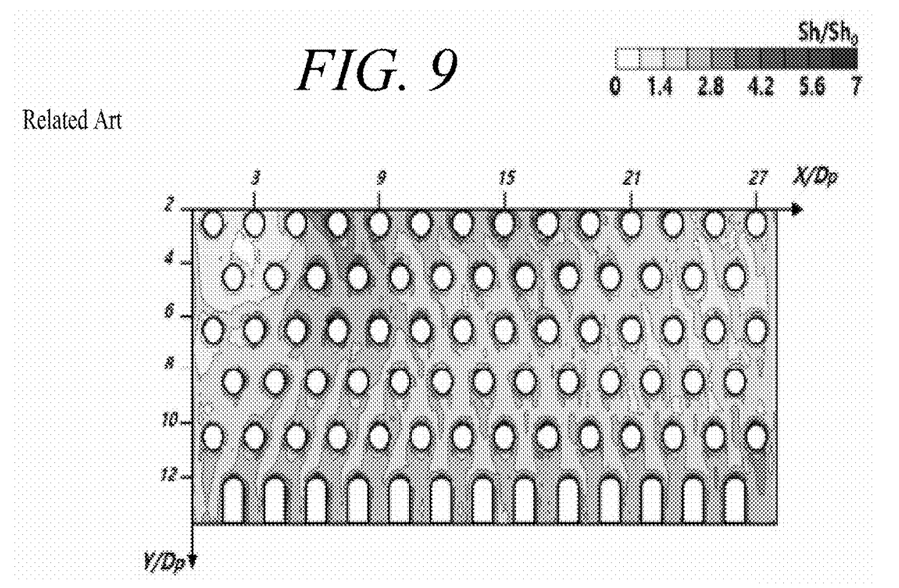
FIG. 9 is a graph illustrating heat/mass transfer distribution on a suction surface of the related art cooling fin.
Figure 10:
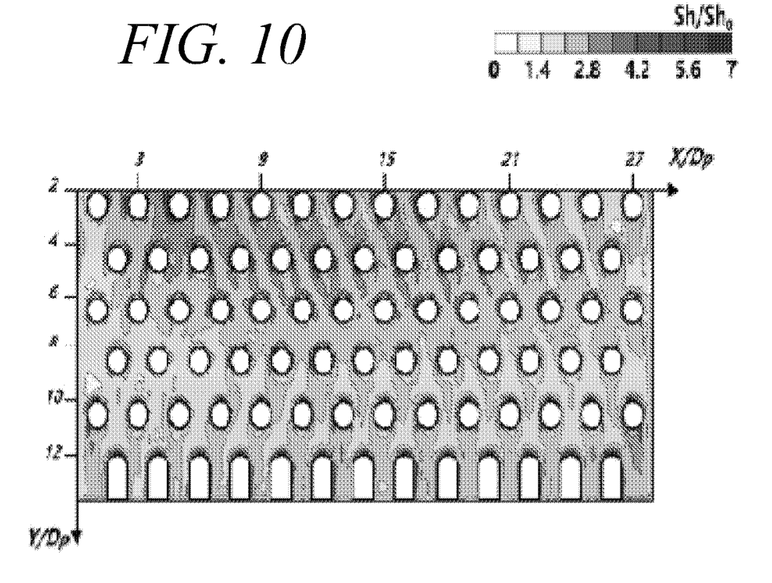
FIG. 10 is a graph illustrating heat/mass transfer distribution on a suction surface of the cooling fin according to the first exemplary embodiment.

FIG. 9 is a graph illustrating heat/mass transfer distribution on an inner surface of a suction surface of the related art cooling fin, and FIG. 10 is a graph illustrating heat/mass transfer distribution on an inner surface of a suction surface of the cooling fin according to the first exemplary embodiment. Here, the inner surface of suction surface S1 may be an inner surface of a wall surface forming the suction surface S1 in the rear cooling path 1442. Referring to FIGS. 9 and 10, because the cooling fin 1461 according to the first exemplary embodiment is coupled to the flow guide rod 1462, it can be seen that a heat transfer material is more distributed on the suction surface S1 than in the related art cooling fin. Accordingly, the cooling fin 1461 according to the first exemplary embodiment may have improved cooling efficiency compared to the related art.

Figure 11:
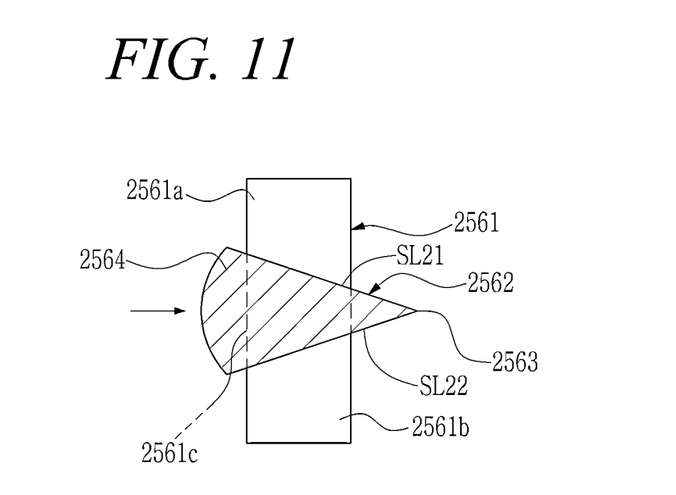
FIG. 11 is a cross-sectional view illustrating a cooling fin and a flow guide rod according to a second exemplary embodiment.

Hereinafter, a cooling fin and a flow guide rod according to a second exemplary embodiment will be described. FIG. 11 is a sectional view illustrating a cooling fin and a flow guide rod according to a second exemplary embodiment.

Referring to FIG. 11, the cooling fins 2561 may have a cylindrical shape and may be arranged at intervals in the rear cooling path. The flow guide rod 2562 extends in the height direction of the airfoil part to connect the cooling fins 2561. The flow guide rod 2562 supports the cooling fins 2561 and guides a flow of cooling air to improve cooling efficiency.

Each of the cooling fins 2561 includes an upper fin portion 2561*a* protruding upward from an upper portion of the flow guide rod 2562, a lower fin portion 2561*b* protruding downward from a lower portion of the flow guide rod 2562, and an intermediate fin portion 2561*c* inserted into the flow guide rod 2562. The upper fin portion 2561*a* and the lower fin portion 2561*b* receive heat from a wall surface of the airfoil part, and the intermediate fin portion 2561*c* transfers the heat to the flow guide rod 2562. Here, the upper fin portion 2561*a*, the lower fin portion 2561*b*, and the flow guide rod 2562 may be cooled by cooling air.

The flow guide rod 2562 may include a front convex portion 2564 formed to protrude in an arc shape on a leading end thereof, a corner portion 2563 formed on a rear end thereof, and two inclined surfaces SL21 and SL22 connecting the front convex portion 2564 and the corner portion 2563. In addition, the flow guide rod 2562 may be formed to gradually decrease in thickness toward the trailing edge.

Accordingly, the flow guide rod 2562 may press the cooling air against a wall surface of the cooling path, thereby improving cooling efficiency.

Figure 12:
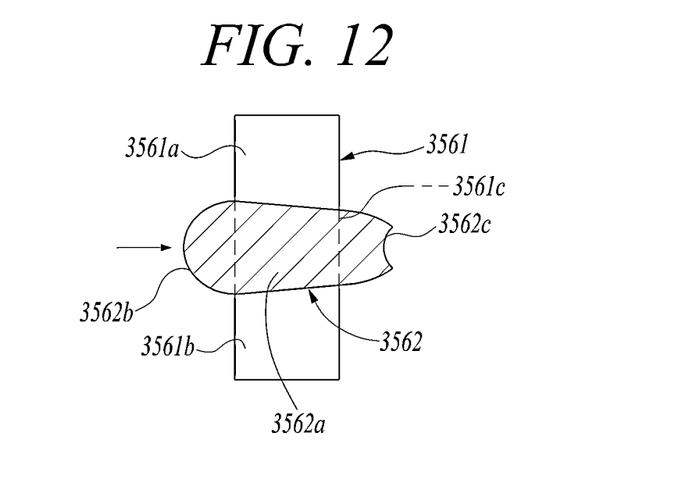
FIG. 12 is a cross-sectional view illustrating a cooling fin and a flow guide rod according to a third exemplary embodiment.

Hereinafter, a cooling fin and a flow guide rod according to a third exemplary embodiment will be described. FIG. 12 is a sectional view illustrating a cooling fin and a flow guide rod according to a third exemplary embodiment.

Referring to FIG. 12, the cooling fins 3561 may have a cylindrical shape and may be arranged at intervals in the rear cooling path. The flow guide rod 3562 extends in the height direction of the airfoil part to connect the cooling fins 3561. The flow guide rod 3562 supports the cooling fins 3561 and guides a flow of cooling air to improve cooling efficiency.

Each of the cooling fins 3561 includes an upper fin portion 3561*a* protruding upward from an upper portion of the flow guide rod 3562, a lower fin portion 3561*b* protruding downward from a lower portion of the flow guide rod 3562, and an intermediate fin portion 3561*c* inserted into the flow guide rod 3562. The upper fin portion 3561*a* and the lower fin portion 3561*b* receive heat from a wall surface of the airfoil part, and the intermediate fin portion 3561*c* transfers the heat to the flow guide rod 3562. Here, the upper fin portion 3561a, the lower fin portion 3561b, and the flow guide rod 3562 may be cooled by cooling air.

The flow guide rod 3562 may include a front convex portion 3562b disposed on a leading end thereof to protrude in an arc shape, a rear concave portion 3562c disposed on a rear end thereof to be recessed in an arc shape, and a wedge portion 3562a gradually decreasing in thickness toward the trailing edge to connect the front convex portion 3562b and the rear concave portion 3562c.

The front convex portion 3562b guides an inflow toward the flow guide rod 3562, and the wedge portion 3562a presses the cooling air to flow toward an inner wall of the rear cooling path. In addition, the rear concave portion 3562c may induce turbulence to improve cooling efficiency.

Figure 13:
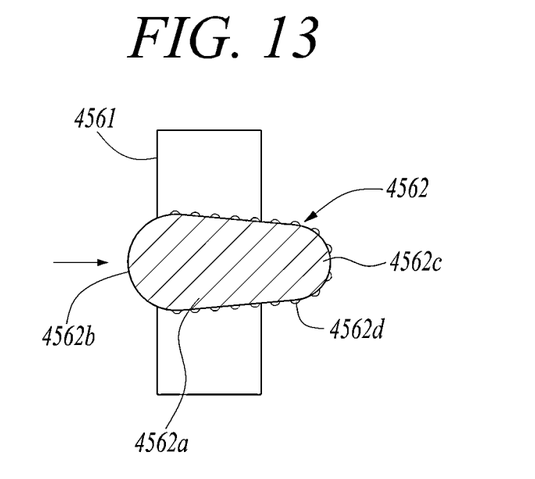
FIG. 13 is a cross-sectional view illustrating a cooling fin and a flow guide rod according to a fourth exemplary embodiment.

Hereinafter, a cooling fin and a flow guide rod according to a fourth exemplary embodiment will be described. FIG. 13 is a sectional view illustrating a cooling fin and a flow guide rod according to a fourth exemplary embodiment.

Referring to FIG. 13, the cooling fins 4561 may have a cylindrical shape and may be arranged at intervals in the rear cooling path. The flow guide rod 4562 extends in the height direction of the airfoil part to connect the cooling fins 4561. The flow guide rod 4562 supports the cooling fins 4561 and guides a flow of cooling air to improve cooling efficiency.

The flow guide rod 4562 may include a wedge portion 4562a having a thickness gradually decreasing toward the trailing edge, a front convex portion 4562b connected to a leading end of the wedge portion 4562a to protrude in an arc shape, and a rear convex portion 4562c connected to a rear end of the wedge portion 4562a to protrude in an arc shape. In addition, a plurality of turbulence forming protrusions 4562d for forming turbulence may be formed on the surface of the flow guide rod 4562.

The turbulence forming protrusions 4562d may have a hemispherical shape and may be spaced apart at regular intervals on the surface of the flow guide rod 4562. The turbulence forming protrusions 4562d are not formed on the front convex portion 4562b, but formed only on the wedge portion 4562a and the rear convex portion 4562c. Accordingly, the cooling air flows in a laminar flow according to the guidance of the front convex portion 4562b while flowing into the front convex portion 4562b, and forms turbulence while flowing along the wedge portion 4562a and the rear convex portion 4562c, thereby maximizing the cooling efficiency due to contact of the cooling fins 4561 with turbulence.

If the turbulence forming protrusions 4562d are formed in this way, turbulence is formed on the surface of the flow guide rod 4562, so that the cooling efficiency of the airfoil part can be further increased.

Figure 14:
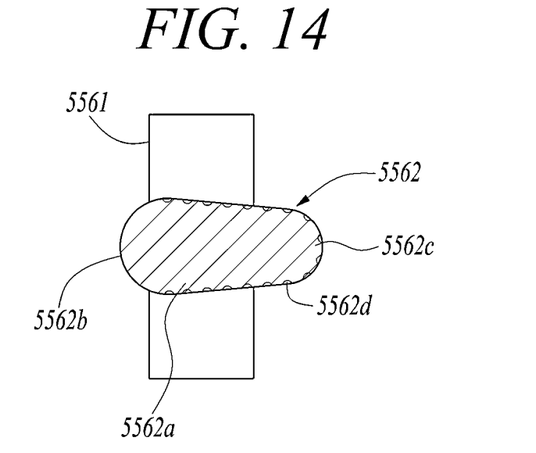
FIG. 14 is a cross-sectional view illustrating a cooling fin and a flow guide rod according to a fifth exemplary embodiment.

Hereinafter, a cooling fin and a flow guide rod according to a fifth exemplary embodiment will be described. FIG. 14 is a sectional view illustrating a cooling fin and a flow guide rod according to a fifth exemplary embodiment.

Referring to FIG. 14, the cooling fins 5561 may have a cylindrical shape and may be arranged at intervals in the rear cooling path. The flow guide rod 5562 extends in the height direction of the airfoil part to connect the cooling fins 5561. The flow guide rod 5562 supports the cooling fins 5561 and guides a flow of cooling air to improve cooling efficiency.

The flow guide rod 5562 may include a wedge portion 5562a having a thickness gradually decreasing toward the trailing edge, a front convex portion 5562b connected to a leading end of the wedge portion 5562a to protrude in an arc shape, and a rear convex portion 5562c connected to a rear end of the wedge portion 5562a to protrude in an arc shape.

In addition, a plurality of turbulence forming grooves 5562d for forming turbulence may be formed on the surface of the flow guide rod 5562.

The turbulence forming grooves 5562d may have a hemispherical shape and may be spaced apart at regular intervals on the surface of the flow guide rod 5562. The turbulence forming grooves 5562d are not formed on the front convex portion 5562b, but formed only on the wedge portion 5562a and the rear convex portion 5562c. Accordingly, the cooling air flows in a laminar flow according to the guidance of the front convex portion 5562b while flowing into the front convex portion 5562b, and forms turbulence while flowing along the wedge portion 5562a and the rear convex portion 5562c, thereby maximizing the cooling efficiency due to contact of the cooling fins 5561 with turbulence.

If the turbulence forming grooves 5562d are formed in this way, turbulence is formed on the surface of the flow guide rod 5562, so that the cooling efficiency of the airfoil part can be further increased.

While exemplary embodiments have been described with reference to the accompanying drawings, it will be apparent to those skilled in the art that various modifications in form and details can be made therein without departing from the spirit and scope as set forth in the appended claims. Therefore, the description of the exemplary embodiments should be construed in a descriptive sense and not to limit the scope of the claims, and many alternatives, modifications, and variations will be apparent to those skilled in the art.

What is claimed is:

1. An airfoil having a leading edge and a trailing edge, the airfoil comprising:
    a rear cooling path connected to the trailing edge to discharge air to the trailing edge;
    a plurality of cooling fins formed in the rear cooling path; and
    a flow guide rod connecting the cooling fins to support the cooling fins,
    wherein each of the plurality of cooling fins comprises an upper fin portion protruding upward from an upper portion of the flow guide rod, a lower fin portion protruding downward from a lower portion of the flow guide rod, and an intermediate fin portion inserted through the flow guide rod.

2. The airfoil according to claim 1, wherein the flow guide rod is formed to extend in a height direction of the airfoil.

3. The airfoil according to claim 2, wherein the airfoil comprises a first inclined surface pressing cooling air against one side of the rear cooling path, and a second inclined surface pressing the cooling air against the other side of the rear cooling path.

4. The airfoil according to claim 3, wherein the flow guide rod has a thickness gradually decreasing toward the trailing edge.

5. The airfoil according to claim 2, wherein the flow guide rod comprises a wedge portion having a thickness gradually decreasing toward the trailing edge, a front convex portion connected to a leading end of the wedge portion to protrude in an arc shape, and a rear convex portion connected to a rear end of the wedge portion to protrude in an arc shape.

6. The airfoil according to claim 5, wherein a surface of the flow guide rod is provided with a plurality of turbulence forming protrusions forming turbulence.

7. The airfoil according to claim 6, wherein the turbulence forming protrusions are formed in the wedge portion and the rear convex portion.

8. The airfoil according to claim 5, wherein a surface of the flow guide rod is provided with a plurality of turbulence forming grooves forming turbulence.

9. The airfoil according to claim 1, wherein the flow guide rod comprises a corner portion formed at a leading end thereof, a rear planar portion formed at a rear end thereof, and two inclined surfaces connecting the corner portion and the rear planar portion, the inclined surfaces having a thickness gradually decreasing toward the trailing edge.

10. The airfoil according to claim 1, wherein the flow guide rod comprises a front convex portion disposed at a leading end thereof to protrude in an arc shape, a rear concave portion disposed at a rear end thereof to be recessed in an arc shape, a wedge portion connecting the front convex portion and the rear concave portion and having a thickness gradually decreasing toward the trailing edge.

11. A turbine comprising:
a rotor disk configured to be rotatable; and
a plurality of turbine blades installed on the rotor disk,
wherein each of the turbine blades comprises an airfoil having an airfoil shape and including a leading edge and a trailing edge, a platform part coupled to a lower portion of the airfoil, and a root part protruding downward from the platform part and coupled to the rotor disk,
wherein the airfoil comprises:
a rear cooling path connected to the trailing edge to discharge air to the trailing edge;
a plurality of cooling fins formed in the rear cooling path; and
a flow guide rod connecting the cooling fins to support the cooling fins,
wherein each of the plurality of cooling fins comprises an upper fin portion protruding upward from an upper portion of the flow guide rod, a lower fin portion protruding downward from a lower portion of the flow guide rod, and an intermediate fin portion inserted through the flow guide rod.

12. The turbine according to claim 11, wherein the flow guide rod is formed to extend in a height direction of the airfoil.

13. The turbine according to claim 12, wherein the airfoil comprises a first inclined surface pressing cooling air against one side of the rear cooling path, and a second inclined surface pressing the cooling air against the other side of the rear cooling path.

14. The turbine according to claim 13, wherein the flow guide rod has a thickness gradually decreasing toward the trailing edge.

15. The turbine according to claim 12, wherein the flow guide rod comprises a wedge portion having a thickness gradually decreasing toward the trailing edge, a front convex portion connected to a leading end of the wedge portion to protrude in an arc shape, and a rear convex portion connected to a rear end of the wedge portion to protrude in an arc shape.

16. The turbine according to claim 15, wherein a surface of the flow guide rod is provided with a plurality of turbulence forming protrusions forming turbulence.

17. The turbine according to claim 16, wherein the turbulence forming protrusions are formed in the wedge portion and the rear convex portion.

18. The turbine according to claim 15, wherein a surface of the flow guide rod is provided with a plurality of turbulence forming grooves forming turbulence.

19. The turbine according to claim 11, wherein the flow guide rod comprises a corner portion formed at a leading end thereof, a rear planar portion formed at a rear end thereof, and two inclined surfaces connecting the corner portion and the rear planar portion, the inclined surfaces having a thickness gradually decreasing toward the trailing edge.

20. A gas turbine comprising:
a compressor configured to compress air introduced from an outside;
a combustor configured to mix the compressed air compressed by the compressor with fuel and combust an air-fuel mixture; and
a turbine including a plurality of turbine blades rotating by combustion gas discharged from the combustor,
wherein each of the turbine blades comprises an airfoil having an airfoil shape and including a leading edge and a trailing edge, a platform part coupled to a lower portion of the airfoil, and a root part protruding downward from the platform part and coupled to the rotor disk,
wherein the airfoil comprises:
a rear cooling path connected to the trailing edge to discharge air to the trailing edge;
a plurality of cooling fins formed in the rear cooling path; and
a flow guide rod connecting the cooling fins to support the cooling fins,
wherein each of the plurality of cooling fins comprises an upper fin portion protruding upward from an upper portion of the flow guide rod, a lower fin portion protruding downward from a lower portion of the flow guide rod, and an intermediate fin portion inserted through the flow guide rod.

* * * * *